(12) United States Patent
Chiba (10) Patent No.: US 8,655,412 B2
(45) Date of Patent: Feb. 18, 2014

(54) INFORMATION PROCESSING APPARATUS HAVING A DISPLAY WITH LUMINANCE OR ILLUMINANCE CONTROLLED DEPENDING ON AN APPARATUS CONDITION

(75) Inventor: Yuuichiro Chiba, Fuchu (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 219 days.

(21) Appl. No.: 12/164,301

(22) Filed: Jun. 30, 2008

(65) Prior Publication Data

US 2009/0143108 A1   Jun. 4, 2009

(30) Foreign Application Priority Data

Nov. 30, 2007 (JP) ................ P2007-310688

(51) Int. Cl.
*H04B 1/38* (2006.01)
(52) U.S. Cl.
USPC ........ 455/566; 455/575.3; 455/418; 345/102; 345/170; 345/76
(58) Field of Classification Search
USPC .................. 455/400–466, 550–575
See application file for complete search history.

(56) References Cited

U.S. PATENT DOCUMENTS

| 2005/0272462 | A1* | 12/2005 | Okamoto | 455/550.1 |
| 2005/0285826 | A1* | 12/2005 | Park et al. | 345/76 |
| 2006/0121940 | A1* | 6/2006 | Kong et al. | 455/557 |
| 2006/0192748 | A1* | 8/2006 | Lowles et al. | 345/102 |
| 2007/0075965 | A1* | 4/2007 | Huppi et al. | 345/156 |
| 2007/0298850 | A1* | 12/2007 | Miyata et al. | 455/575.3 |
| 2008/0088591 | A1* | 4/2008 | Joo et al. | 345/170 |
| 2008/0192019 | A1* | 8/2008 | Lee et al. | 345/173 |
| 2010/0245310 | A1 | 9/2010 | Hashimoto | |

FOREIGN PATENT DOCUMENTS

| JP | 2002-057776 A | 2/2002 |
| JP | 2005-123930 A | 5/2005 |
| JP | 2006-005712 A | 1/2006 |
| JP | 2006-303747 A | 11/2006 |
| JP | 2006-324926 A | 11/2006 |
| JP | 2007-288519 A | 11/2007 |
| WO | 2009-057527 A1 | 5/2009 |

OTHER PUBLICATIONS

JP Office Action mailed on Sep. 18, 2012 as received in application No. 2007-310688.
JP Office Action dated Mar. 21, 2012 as received in related application No. 2007-310688.

* cited by examiner

*Primary Examiner* — Rafael Pérez-Gutiérrez
*Assistant Examiner* — Keith Fang
(74) *Attorney, Agent, or Firm* — Maschoff Brennan (57) ABSTRACT

A mobile communication apparatus includes: a first casing including a display unit having a backlight; a second casing being connected to the first casing, and having an input unit; a condition detecting unit that detects whether a condition is changed from a first condition to a second condition, the first condition in which the first casing is overlapped with the second casing, the second condition being different from the first condition; and a control unit that controls the backlight to illuminate the display unit by turning on the backlight in a certain turn-on condition when the condition detecting unit detects that the first condition is changed to the second condition. The backlight is turned on in a lower value than a normal value in at least one of luminance and illuminance.

19 Claims, 6 Drawing Sheets

FIG. 1A — CLOSED CONDITION

FIG. 1B — OPENED CONDITION

HINGE PORTION IS PIVOTALLY MOVED

CASING IS CLOSED

FIG. 4B

CASING IS OPENED

SLIDING PORTION IS SLID

FIG. 5

INFORMATION PROCESSING APPARATUS HAVING A DISPLAY WITH LUMINANCE OR ILLUMINANCE CONTROLLED DEPENDING ON AN APPARATUS CONDITION

The entire disclosure of Japanese Patent Application No. 2007-310688 filed on Nov. 30, 2007 including specification, claims, drawings and abstract is incorporated herein by reference in its entirety.

BACKGROUND OF THE INVENTION

1. Field of the Invention

The invention is related to a mobile communication apparatus capable of improving power saving effects as to either a display unit or a backlight of the display unit.

2. Description of the Related Art

In conventional mobile communication apparatuses such as portable telephones and Personal Digital Assistants (PDAs), hinge portions are provided on main bodies to make main bodies openable and closable. More specifically, the mobile communication apparatus is divided into display-sided casings where optical sensors is mounted and main body keyboard-sided casings by employing the hinge portions. Then, for example, an open/close detecting apparatus is installed in a control circuit in the main body keyboard-sided casing. When the two overlapped casings are opened, for instance, a keyboard and a display are exposed on the inner side of these two casings.

Among these conventional mobile communication apparatuses, some mobile communication apparatuses perform the below-mentioned control operations: That is, when two sets of casings are opened, brightness around an optical sensor is determined by the optical sensor built in one casing. When the surrounding is bright, the mobile communication apparatus performs a control to turn off backlight of display units. When the surrounding is dark, the mobile communication apparatus performs a control to turn on the backlight. Furthermore, there are some mobile communication apparatuses which perform the following control operations: That is, after the backlight illuminating display units is turned ON, when telephone calls are not made and key inputs are not entered within a certain time duration, the mobile communication apparatus performs a control to turn off the backlight. When key inputs are entered after the turn-OFF operation, the mobile communication apparatus performs a control to turn on the backlight again (see JP-A-2002-57776, for instance).

SUMMARY OF THE INVENTION

However, in the above-described conventional mobile communication apparatus, when the casings are opened and/or closed, the control operations are carried out only to turn on or turn off the backlight. Since the luminance when the backlight is turned on is set to very bright, a plenty of electric power is consumed. As a result, electric energy of batteries may be quickly consumed. To the contrary, if the control operation is set in such a manner that the backlights are not turned ON, then there is such a problem that characters can be hardly read at places where illuminance of surroundings is dark.

The invention has been made by solving the above-described problem, and therefore, has an object to provide a mobile communication apparatus capable of suppressing power consumption by turning ON a backlight of a display unit based upon a level of either luminance or illuminance in response to use conditions of a user, since brightness of the display unit, or brightness of the backlight of the display unit can be set in a plurality of stages.

According to one aspect of the invention, a mobile communication apparatus, includes: a first casing including a display unit having a backlight; a second casing being connected to the first casing, and having an input unit; a condition detecting unit that detects whether a condition is changed from a first condition to a second condition, the first condition in which the first casing is overlapped with the second casing, the second condition being different from the first condition; and a control unit that controls the backlight to illuminate the display unit by turning on the backlight in a certain turn-on condition when the condition detecting unit detects that the first condition is changed to the second condition; wherein the backlight is turned on in a lower value than a normal value in at least one of luminance and illuminance.

According to another aspect of the invention, a mobile communication apparatus, includes: a first casing having a display unit of an organic electroluminescence (EL) device; a second casing being connected to the first casing, and having an input unit; a condition detecting unit that detects whether a condition is changed from a first condition to a second condition, the first condition in which the first casing is overlapped with the second casing, the second condition being different from the first condition; and a control unit that controls a current value to illuminate the display unit by supplying the organic EL device with a current in a lower current value than a normal value.

BRIEF DESCRIPTION OF THE DRAWINGS

Embodiment may be described in detail with reference to the accompanying drawings, in which.

DETAILED DESCRIPTION OF THE INVENTION

Referring now to drawings, a description is made of embodiments of the invention.

Figure 1A:
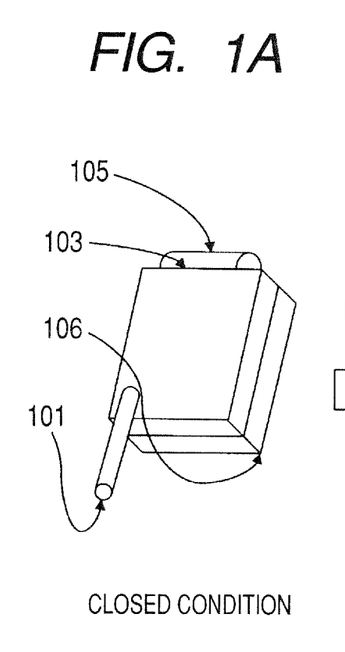
FIGS. 1A and 1B are outer appearance views of a folding type mobile communication apparatus according to an embodiment mode of the invention.
Figure 1B:
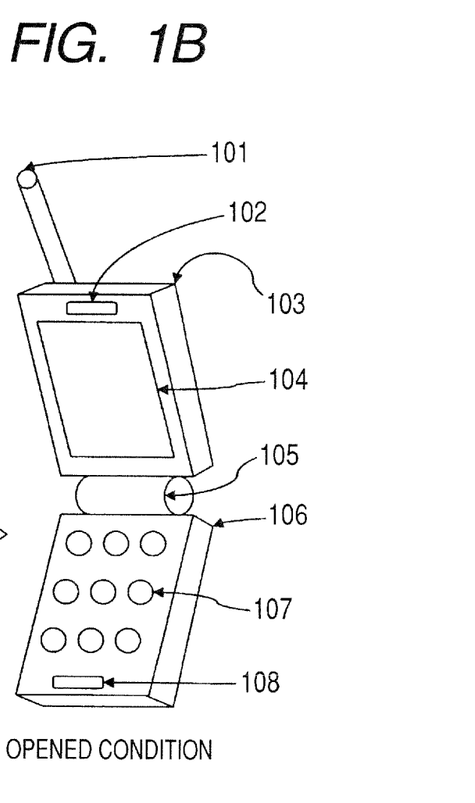

FIGS. 1A and 1B are diagrams for showing an outer appearance of a mobile communication apparatus to which the invention has been applied. A display unit 104 having a backlight function is provided inside an upper casing 103, a main body of a control unit is provided in an inner portion of a lower casing 106, and a keyboard 107 is provided inside the lower casing 106. Then, FIGS. 1A and 1B show an opened condition and a closed condition of the upper casing 103 and the lower casing 106, respectively. The upper casing 103 is coupled to the lower casing 106 by a hinge portion 105 in a freely openable and closable manner. The upper casing 103 and the lower casing 106 are opened and closed in such a manner that an open/close angle is defined between substantially 180 degrees (opened condition) and substantially 0 degree (closed condition).

Then, when the upper casing 103 and the lower casing 106 are brought into such a closed condition that the upper casing 103 is overlapped with the lower casing 106, both the display unit 104 and the keyboard 107 are positioned at inner planes of the casings 103 and 106. A user can set the upper casing 103 to such a condition that the upper casing 103 is pivotally moved by an angle of 180 degrees, and operate the keyboard 107 while visually observing the display unit 104.

Also, as shown in FIGS. 1A and 1B, an antenna 101 used in a wireless communication is installed on an outer plane of the upper casing 103, and a speaker 102 which is employed so as to receive a telephone conversation is installed inside the upper casing 103. Furthermore, a microphone 108 employed so as to transmit a telephone conversation and input voice is installed on the lower side of the lower casing 106. In the display unit 104, for instance, a liquid crystal display LCD, an organic electroluminescence (EL), or the like is employed. On the keyboard 107, a cross key, a power supply key, function keys, and the like are provided in addition to data keys for entering numerals, characters, symbols, and the like.

Figure 2:
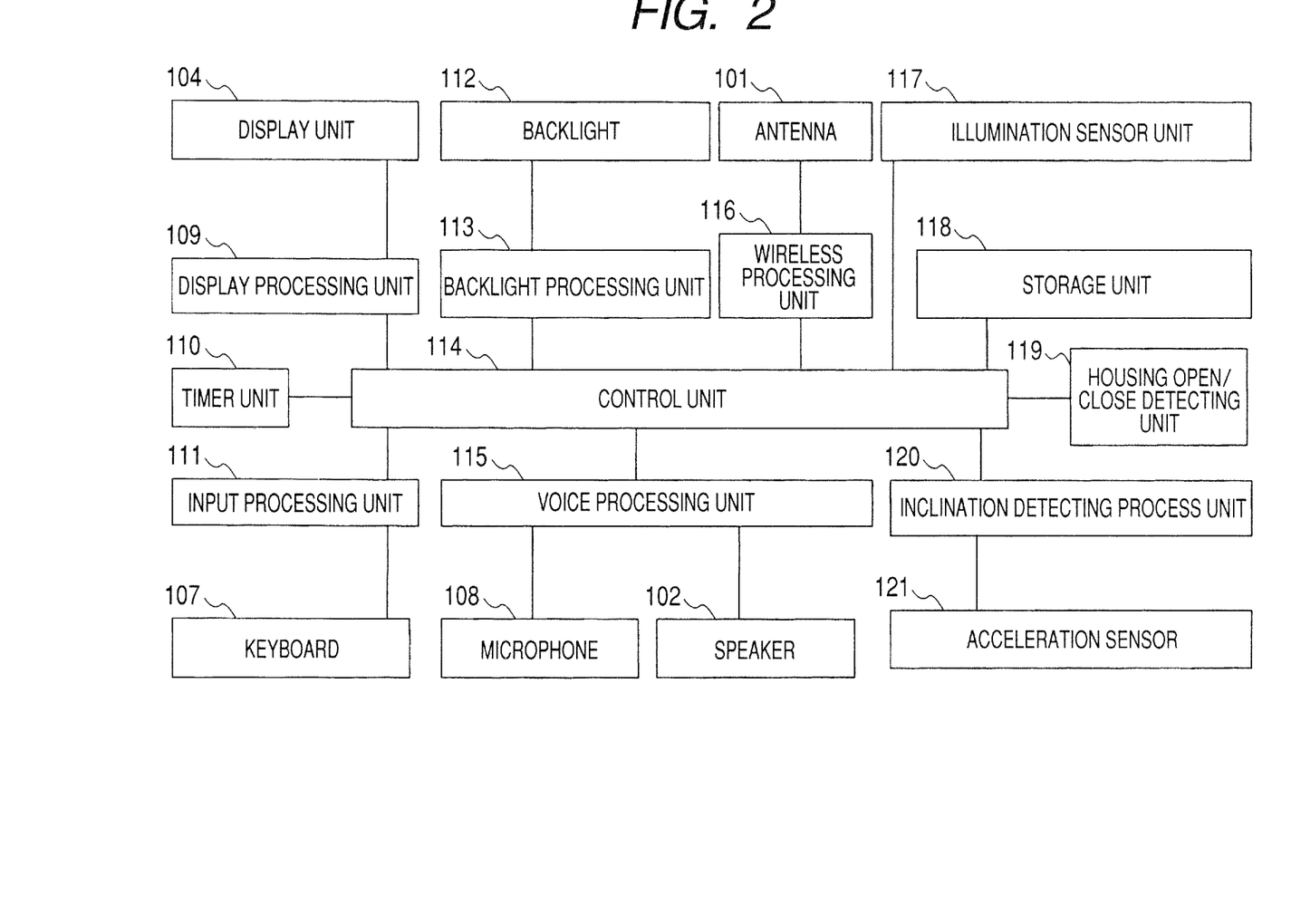
FIG. 2 is a block diagram of the mobile communication apparatus.

FIG. 2 is a block diagram for showing an internal arrangement of the above-described mobile communication apparatus.

The mobile communication apparatus is equipped with an antenna 101, a wireless processing unit 116, a speaker 102, a microphone 108, and a voice processing unit 115. The antenna 101 communicates with a base station (not shown) in a wireless manner. The wireless processing unit 116 receives a signal received by the antenna 101 so as to transmit the received signal to a control unit 114, or transmits a signal received from the control unit 114 to the antenna 101. The speaker 102 is employed so as to receive a telephone communication. The microphone 108 inputs thereinto voice from a user. The voice processing unit 115 receives a voice signal entered by the microphone 108 so as to transmit the received voice signal to the control unit 114, or outputs a voice signal received by the antenna 101 via the wireless processing unit 116 and the control unit 114 to the speaker 102.

Also, the mobile communication apparatus is provided with a casing open/close detecting unit 119, a storage unit 118, a timer unit 110, a display processing unit 109, a display unit 104, and a backlight processing unit 113. The casing open/close detecting unit 119 detects whether both the upper casing 103 and the lower casing 106 are brought into an opened condition, or a closed condition, and then, transmit the detection result to the control unit 114. The storage unit 118 stores thereinto at least information as to either luminance or illuminance when a backlight 112 is turned ON, an automatic turn-OFF time, a user register table, various sorts of data folders, and the like. The timer unit 110 counts a time instant so as to output the counted time instant to the control unit 114. The display processing unit 109 receives information entered at the keyboard 107 and information received from the antenna 101 via the control unit 114 and the like, and then, transmits the received information to the display unit 104. The display unit 104 displays thereon the information received from the display processing unit 109 in a visible manner. The backlight processing unit 113 performs a turn-on control operation of the backlight 112 which illuminates the display unit 104 under control of the control unit 114.

Furthermore, the mobile communication apparatus is equipped with an input processing unit 111, an acceleration sensor unit 121, an inclination detecting process unit 120, and an illuminance sensor unit 117. The input processing unit 111 transmits information entered at the keyboard 107 to the control unit 114. The acceleration sensor unit 121 senses acceleration applied to the upper casing 103, and then transmits the detected acceleration result to the inclination detecting process unit 120. The illuminance sensor unit 117 measures, for example, illuminance surrounding the upper casing 103, and then, enters the measurement result to the control unit 114. The control unit 114 is connected to at least the display processing unit 109, the timer unit 110, the input processing unit 111 the backlight processing unit 113, the voice processing unit 115, the wireless processing unit 116, the illuminance sensor unit 117, the storage unit 118, the casing open/close detecting unit 119, and the inclination detecting process unit 120 so as to control the entire system of the mobile communication apparatus.

A description is made of operations as to backlight functions realized by the display unit 104, the backlight 112, and the backlight processing unit 113 employed in the mobile communication apparatus arranged in the above-described manner, according to the invention.

Firstly, the backlight 112 of the mobile communication apparatus is constructed in such a manner that this backlight 112 illuminates the display unit 104 in luminance of at least two stages based upon the backlight processing unit 113. In other words, the first luminance corresponds to light illumination made by the normal luminance when the normal operation is carried out. The normal operation, for example, corresponds to such operations that a telephone call is made from the mobile communication apparatus, an e-mail is transmitted, or a connecting communication to a network is established. The second luminance corresponds to such an illumination made by weak lighting based upon luminance lower than the first luminance (preferably, the second luminance is lower than the first luminance by approximately ½).

For example, when the user views the screen of the mobile communication apparatus in order to simply make a confirmation, a waiting screen is merely displayed on the display unit 104, and therefore, if the brightness is enough to make the screen visible, then there is no problem in operation. In such a case, if the display unit 104 is illuminated by the backlight 112 with the second luminance, then total power consumption can be reduced.

To realize this power saving operation, the storage unit 118 stores the information of the luminance or the illuminance when the backlight 112 is turned on, and when the control unit 114 determines the above-described operation is performed, the control unit 114 reads out the information of the luminance or the illuminance from the storage unit 118 and outputs the read information to the backlight processing unit 113. Then, the backlight processing unit 113 controls the electric power of the backlight 112 based upon the received information of the luminance or the illuminance to illuminate the display unit 104 with the second luminance (with weak light).

Now, a description is made of several methods for storing the information of the luminance or the illuminance into the storage unit 118 to turn on the backlight 112. For instance, assuming now that "n" stages of the luminance for the backlight 112 is prepared ("n" is an integer of two or more), there is a method for storing into the storage unit 118, such information that the backlight 112 is turned on in an "n-m" stage when the mobile communication apparatus is shipped ("m" is an integer smaller than "n", and of one or more). There is another method for storing into the storage unit 118, such information that a user turns on the backlight 112 in the "n-m" stage by manipulating the keyboard 107. There is a further method for storing into the storage unit 118, such information made by the control unit 114 based upon a sensor output from the illuminance sensor unit 117. Specifically, the illuminance sensor unit 117 detects illuminance surrounding the illuminance sensor unit 117, and then, transmits the detected value to the control unit 114. Then, assuming now that n=5, in such a case that the detected value of the illuminance sensor unit 117 is within a range from 0 to 20 in comparison with a maximum reference value "100" held in the control unit 114, the control unit 114 stores such an information that the backlight 112 is turned on in the luminance "1" into the storage unit 118. Also, when the detected value of the illuminance sensor unit 117 is within a range from 21 to 40, the control unit 114 stores such information that the backlight 112 is turned on in the luminance "2" into the storage unit 118. Also, when the detected value of the illuminance sensor unit 117 is within a range from 41 to 60, the control unit 114 stores such information that the backlight 112 is turned on in the luminance "3" into the storage unit 118. Further, when the detected value of the illuminance sensor unit 117 is within a range from 61 to 80, the control unit 114 stores such information that the backlight 112 is turned on in the luminance "4" into the storage unit 118. In this case, a range from 81 to 100 is characterized that the backlight 112 is turned on in full power condition, so that the stage control is not carried out.

In the case that an organic EL device is employed in the display unit 104, the processing operation executed in the backlight 112 and the backlight processing unit 113 may be alternatively carried out in the display processing unit 109 and the display unit 104. In this alternative case, since a current is supplied to the organic EL device, light emitting layers emit light therefrom, and emitted light is colored by respective red, green, and blue elements, and then, luminance is controlled based upon values of currents supplied to the organic EL device.

Here, a control operation for increasing and decreasing the luminance of the backlight 112 corresponds to an operation for increasing and decreasing a value of a current supplied to the organic EL device (increasing and decreasing of current value correspond to luminance of organic EL device). Below when the organic EL device is employed in the display device 104 of the embodiment, the first-mentioned control operation for the liquid crystal display device should be substituted by the above-explained control operation for the organic EL device.

Figure 3:
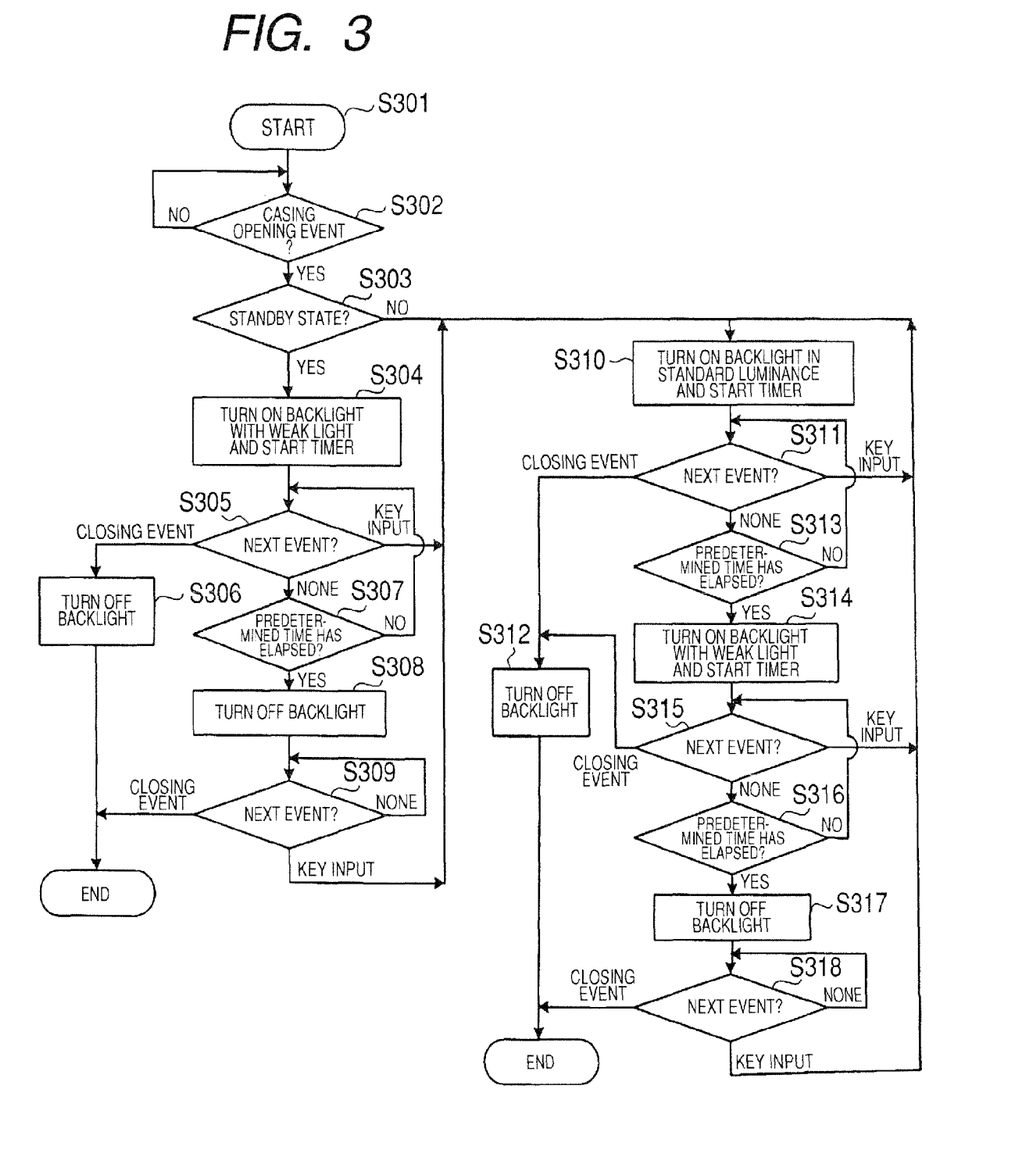
FIG. 3 is a process flow chart related to turning-ON of a backlight of the folding type mobile communication apparatus.

FIG. 3 is a flow chart showing control operations of the backlight 112 according to an embodiment.

When a main power supply (not shown) of the mobile communication apparatus is turned ON, the mobile communication apparatus is brought into an operation starting status (step S301). When a user opens and closes the upper casing 103 and the lower casing 106 based upon a certain action, the control unit 114 receives a signal supplied from the casing open/close detecting unit 119, and determines that the upper casing 103 and the lower casing 106 are changed from the closed condition to the opened condition, namely a condition change occurs ("Yes" in step S302). When the condition change does not occur, the mobile communication apparatus keeps its waiting condition in step S302.

The control unit 114 receives a signal from the wireless processing unit 116 so as to determine whether or not the operation condition of the mobile communication apparatus is in a standby state (step S303). For instance, if no signal is supplied from the wireless processing unit 116, then the mobile communication apparatus is in a standby state. Also, in the standby state, that is a telephone calling signal from the wireless processing unit 116 has not yet been received, or a reception of an e-mail has not yet been read, such information "telephone, E-mail has received" is displayed on the waiting screen. However, in such a case that an e-mail is under reception, or a telephone calling signal is under reception, such an information screen "under reception" is displayed instead of the waiting screen.

When the control unit 114 determines that the present state is not "standby" state based upon the signal supplied from the wireless processing unit 116 ("No" in step S303), the control unit 114 reads out the information of the luminance or the illuminance previously stored in the storage unit 118, and then, the backlight processing unit 113 controls the backlight 112 in such a manner that the backlight 112 illuminates the display unit 104 in the normal luminance (namely, first luminance). Furthermore, the control unit 114 reads out the automatic turn-off time from the storage unit 118, and initiates the timer unit 110 so as to start a measuring operation of an illumination time under the normal standard luminance (first luminance) (step S310). A subsequent operation in this case will be discussed later in detail.

When the upper and lower casings 103 and 106 are opened from the closed condition to the opened condition, in such a case that the control unit 114 determines that the present state is "standby" in the above-described process sequence ("Yes" in step S303), the control unit 114 reads out the information of the luminance or the illuminance previously stored in the storage unit 118, and then, sets the read information to the backlight processing unit 113. As a result, the backlight processing unit 113 controls the backlight 112 to illuminate the display unit 104 with weak light (second luminance). Furthermore, the control unit 114 reads out the automatic turn-off time from the storage unit 118, and initiates the timer unit 110 so as to start a detecting operation of an illumination time under the weak light (step S304).

When a key input operation is carried out and an event is detected while the backlight 112 is being turned on with weak light so as to illuminate the display unit 104 ("key input" of step S305), the control unit 114 controls the backlight processing unit 113 to turn on in the normal standard luminance (first luminance) in a step S310. In this example, the "event" corresponds to a key operation made by the keyboard 107, a voice input operation made at the microphone 108, an inclination input operation made at the acceleration sensor unit 121, and the like.

In this case, as specific operations, the following operations are conceivable: That is, a telephone number for a telephone communication is read out; an e-mail is viewed, an e-mail is formed, and the formed e-mail is transmitted; a photographing operation is performed by a camera; an access to the Internet is performed, and various sorts of functions are set, or changed. Operations subsequent to turning on of the backlight 112 with the normal standard luminance (first luminance) by detecting these events will be described later.

In the above-described event operation detection defined in the step S305, the mobile communication apparatus is again closed in response to a certain action, and then, when the casing open/close detecting unit 119 detects the condition change from the opened condition to the closed condition ("closing event" in step S305), the control unit 114 controls the backlight processing unit 113 in order to turn off the backlight 112 (step S306), and then, the process operation is accomplished.

In the event detecting operation of the step S305, when the event is not detected ("None" in step S305), the control unit 114 continuously detects an event and measures a weak-light-illumination time while monitoring the step S307 and the step S305. Then, when the control unit 114 determines that an elapsed time obtained from the timer unit 110 has exceeded the automatic turn-off time, the control unit 114 controls the backlight processing unit 113 in order to turn off the backlight 112 (step S308).

After the control unit 114 turns off the backlight 112, the control unit 114 again detects an event operation when the control unit 114 cannot detect the event operation, the control unit 114 continuously performs the event detecting operation. When the first and second casings 103 and 106 are again closed in response to a certain action, the casing open/close detecting unit 119 detects the condition change from the opened condition to the closed condition, and then the process operation is ended (step S309).

When an event by a key input operation is detected in the step S309, the control unit 114 similarly reads out the information of the luminance or the illuminance previously stored in the storage unit 118, and then, the control unit 114 controls the backlight processing unit 113 such that the backlight 112 illuminates the display unit 104 in the normal standard luminance (first luminance). Moreover, the control unit 114 reads out the automatic turn-off time from the storage unit 118, and initiates the timer unit 110 so as to commence a measuring operation for an illumination time in the normal standard luminance (first luminance) (step S310).

After the process operation defined in the step S310 has been carried out, the control unit 114 monitors a next event similarly to the step S311. Then, when the control unit 114 detects that the mobile communication apparatus has been closed from an output signal from the casing open/close detecting unit 119 ("closing event" in step S311), the control unit 114 controls the backlight processing unit 113 so as to turn OFF the backlight 112 (step S312), and then, the process operation is accomplished. Also, while the input operation such as the key input operation is carried out, the control unit 114 continuously detects this event, and the process operation is returned to the step S310 in which the control unit 114 continuously performs such an operation for turning on the backlight 112 in the normal standard luminance. In addition, when the above-described event is not detected, the control unit 114 continuously detects an event and measures a weak-illumination-time while monitoring the step S313 and the step S311. Then, when the control unit 114 determines that an elapsed time obtained from the timer unit 110 has exceeded the automatic turn-off time, the control unit 114 controls the backlight processing unit 113 in order to turn on the backlight 112 in the second luminance (weak lighting) (step S314).

After the process operation of the step S314 has been executed, the control unit 114 similarly monitors a next event in a step S315. Since the operations from a step S315 to a step S318 are identical to those of the steps S305 to S309, explanations thereof will be omitted.

Figure 4A:
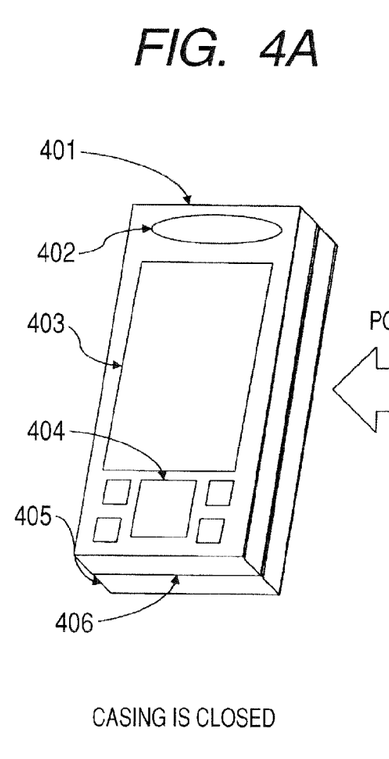
FIGS. 4A and 4B are outer appearance views of a sliding type mobile communication apparatus according to another embodiment of the invention.
Figure 4B:
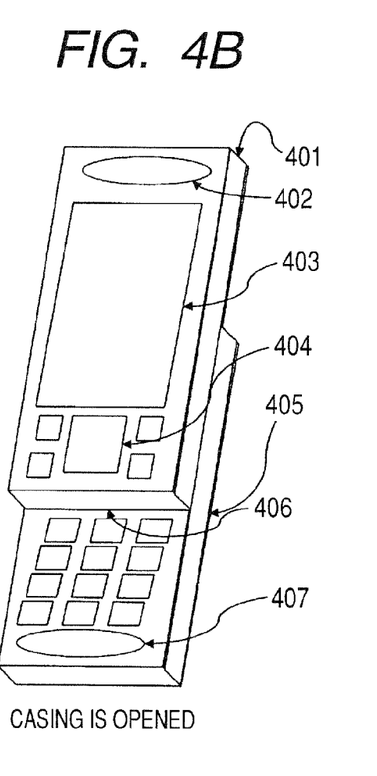

Although the folding type mobile communication apparatus is exemplified in the above-described first embodiment mode, the inventive idea of the invention may be alternatively applied to various modes of other mobile communication apparatus if these mobile communication apparatus are capable of changing positional relationships between two casings. For instance, the inventive idea of the invention may be applied with respect to such a slide type mobile communication apparatus shown in FIGS. 4A and 4B. In the slide type mobile communication apparatus, the below-mentioned structures are realized: That is, an upper casing 401 and a lower casing 405 are moved by a sliding portion 506 along an upper/lower direction; and even when an input unit 404 is located on the lower side of the upper casing 401 and is hidden (namely, closed condition), a display unit 403 is exposed to an external space.

Figure 5:
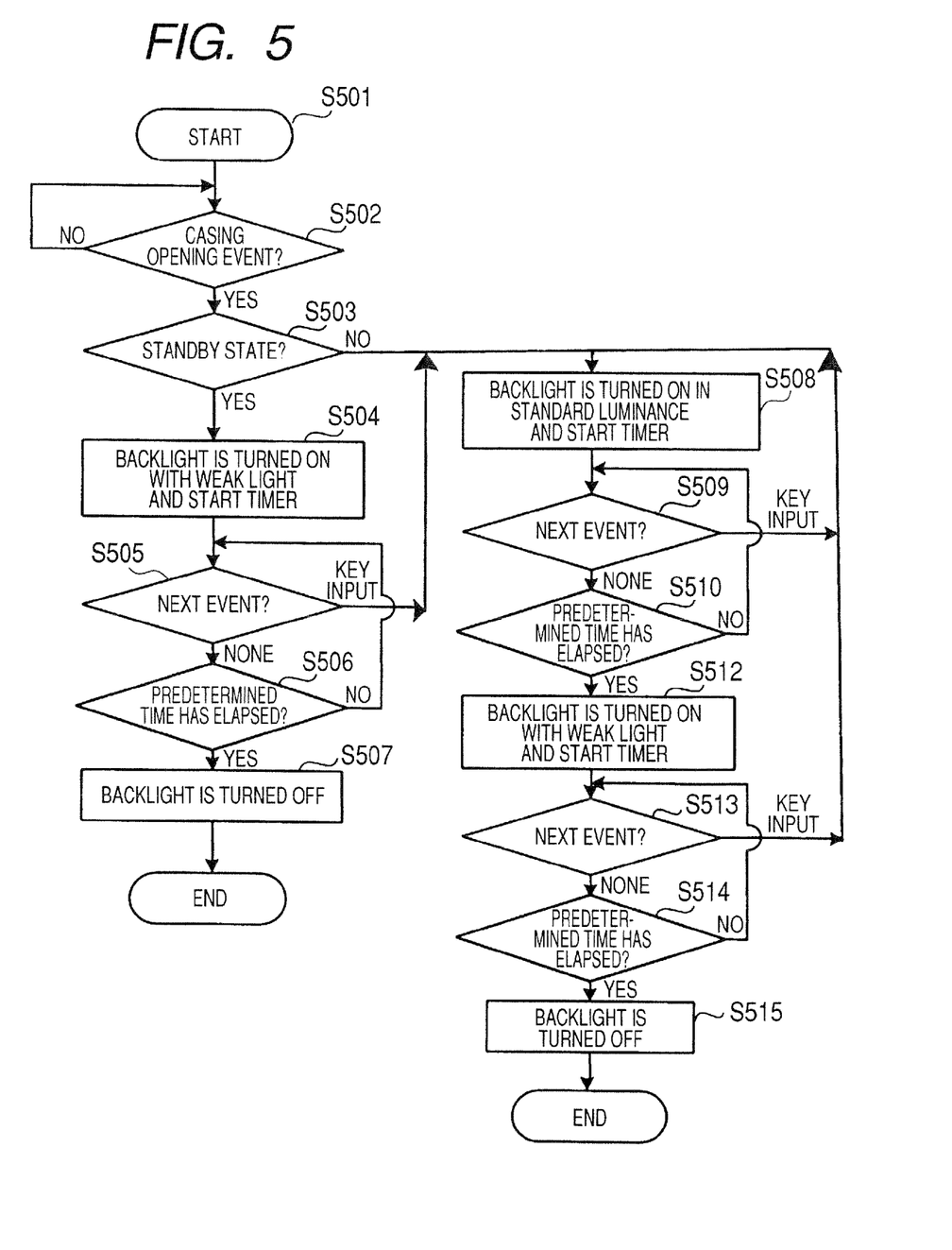
FIG. 5 is a process flow chart related to turning-ON of a backlight of the sliding type mobile communication apparatus.

FIG. 5 is a flow chart showing operations of the backlight 112 in the slide type mobile communication apparatus according to another embodiment mode. It should be noted that the backlight 112 may be controlled based upon the control operation flow of FIG. 3.

The control operation flow of FIG. 5 is different from that of FIG. 3, in omitting the operations, or the determination of the steps S306, S309, S312, and S318. Then, an event detecting operation by the control unit 114 in steps S505, 509, and S513 after the backlight 112 is turned ON in the weak lighting or the normal standard luminance (first luminance) is different from those of FIG. 3. In other words, after the backlight 112 has been turned on in the weak lighting (steps S504 and S512, or in the normal standard luminance (first luminance) (step S508), when the control unit 14 detects an event, the condition change of the upper and lower casings 401 and 405 to the closed condition is not detected as the event. However, only when an input operation such as a key input is performed, the control unit 114 turns on the backlight 112 in the normal standard luminance (first luminance), and also, controls to measure an automatic turn-off time.

Figure 6A:
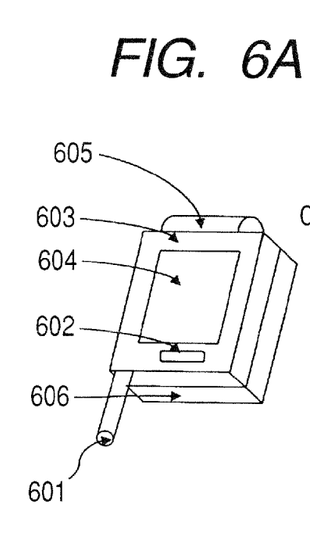
FIGS. 6A and 6B are outer appearance views of a turn over type mobile communication apparatus according to a further embodiment mode of the invention.
Figure 6B:
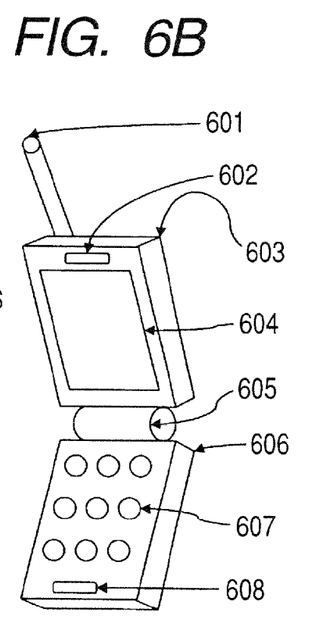

Moreover, as another embodiment, a turn over type mobile communication apparatus as shown in FIGS. 6A and 6B may be conceived. This turnover type mobile communication apparatus is constructed as follows: That is, a hinge portion 605 is constituted by employing two shafts by adding a shaft along a vertical direction with respect to the shaft along the folding direction to the hinge portion 105 of the folding type mobile communication apparatus shown in FIGS. 1A and 1B. Then, as shown in FIG. 6A, first and second casings 603 and 606 can be brought into the closed condition while a display unit 604 remains exposed to the external space. In this embodiment, process operations may be carried out in accordance with the operation flow shown in FIG. 3. Furthermore, when the display unit 604 is directed to the outer side as shown in the closed condition of FIG. 6A, the step S502 of the operation flow shown in FIG. 5 may be substituted by "casing closing event" in carrying out the same operation flow.

Alternatively, a keyboard illuminating portion and a keyboard illumination processing unit may be provided similar to the backlight 112 and the backlight processing unit 113. Then the control unit 114 may control the keyboard illuminating portion and the keyboard illumination processing unit correspondingly to the turning-on conditions of this backlight 112. For instance, in such a construction that backlight illuminating-purpose illumination lamps are provided in correspondence with respective keys (in this case, lamps may be provided in unit of 1 key, or two adjoining keys) of the keyboard 107, the control unit 114 may control illumination by energizing one of the illumination lamps, two of the illumination lamps (positioned on diagonal line), or all of these illumination lamps. Then, for example, when the upper and lower casings 603 and 606 are moved to opened/closed conditions in order to respond to a telephone call during a receiving operation, the backlight 112 is turned on with the normal standard luminance so as to illuminate the display unit 104, and also, all of the illumination lamps are turned on so as to illuminate the keyboard 112. Also, when the condition change is detected by the casing open/close detecting unit 119, and the waiting screen is displayed on the display unit 104, the backlight 112 is turned on by setting the luminance (weak lighting) lower than the normal standard luminance so as to illuminate the display unit 104. Also, either one illumination lamp located at the center portion or two illumination lamps located on the diagonal line are turned on (weak lighting) so as to illuminate the keyboard 107. As a result, even when the keyboard 107 is equipped with the backlight function, the illumination of the keyboard 107 may be controlled in the weak lighting correspondingly to the display unit 104, so that power saving effects may be achieved.

Also, in the case that an organic EL device is employed in the display unit 104 of the embodiment, the process operations "turn off" and "weak lighting" described in the flow charts shown in FIG. 3 and FIG. 5 are required to be replaced as follows.

The process operation "turn off" corresponding to an operation where a current is not supplied to the organic EL device and the display unit 104 is not turned on. Also, the process operation "weak lighting" corresponds to an operation where the organic EL device is turned on in such a condition that a value of a supplied current is decreased by a certain ratio from a current when the organic EL device is turned on in the standard luminance. For example, given that current values of 100, 60, 20 are supplied to red, green, and blue elements in order to turn on respective colors in the standard luminance, when colors are turned on in the "weak lighting", the current value is set to 10 percents of the standard luminance, and current values of 10, 6, 2 are supplied to the respective red, green, and blue elements.

In accordance with the invention, in such a mobile communication apparatus capable of transmitting and/or receiving voice, an image, and data by changing a positional relation between two pieces of casings as to a folding type, a sliding type, or a turnover type, the below-mentioned control operations are carried out: That is, when the condition of the casings is changed, if the present state is a standby state, then a backlight is turned on in the weak lighting; in the case that an operation is not performed within a certain time, or the casings are moved to a closed condition, the backlight is turned off; and further, in such a case that an event (button is pressed) occurs within the certain time, the backlight is turned on with the normal luminance. Since the backlight can be turned on with lower luminance than the normal luminance in response to operating conditions of the mobile communication apparatus, the power consumption can be saved without giving inconvenient feelings to the user. As a result, it is possible to suppress the power consumption of the battery.

It is to be understood that the present invention is not limited to the specific embodiment described above and that the present invention can be embodied with the components modified without departing from the spirit and scope of the present invention. The present invention can be embodied in various forms according to appropriate combinations of the components disclosed in the embodiment described above. For example, some components maybe deleted from the configurations as described as the embodiments. Further, the components in different embodiments maybe used appropriately in combination.

What is claimed is:

1. A mobile communication apparatus, comprising:
   a first casing including a display unit having a backlight and configured to visibly display information;
   a second casing having an input unit and connected to the first casing in a manner movable relative to the first casing;
   a condition detecting unit configured to detect a change in condition of the mobile communication apparatus between a first condition in which the first casing is overlapped with the second casing and a second condition other than the first condition; and
   a timer configured to measure illumination time of the backlight;
   a control unit configured to detect whether the mobile communication apparatus is in a standby state, and to control the backlight to illuminate the display unit with a first luminance greater than zero or to illuminate the display unit with a second luminance greater than zero and less than the first luminance,
   wherein the control unit is configured to control the backlight to illuminate the display unit with the first luminance when the condition detecting unit detects the change in condition of the mobile communication apparatus from the first condition to the second condition and the control unit does not detect the standby state and to then control the backlight to reduce the illumination of the display unit to the second luminance when the timer measures the illumination time of the first luminance and determines that no input is performed at the input unit for a first predetermined time,
   wherein the unit is further configured to control the backlight to illuminate the display unit with the second luminance when the condition detecting unit detects the change in condition of the mobile communication apparatus from the first condition to the second condition and the control unit detects the standby state and to then control the backlight to turn off when the timer measures the illumination time of the second luminance and determines that no input is performed at the input unit for a second predetermined time,
   wherein the display unit illuminated by the backlight with the second luminance has a brightness sufficient to make a screen of the display unit visible for confirmation, and
   wherein the display unit illuminated by the backlight with the first luminance has a brightness sufficient to make a screen of the display unit usable for carrying out an operation of making a telephone call from the mobile communication apparatus, viewing or creating or transmitting an e-mail, or establishing a connecting communication to a network.

2. The mobile communication apparatus of claim 1, wherein
   the control unit controls the backlight such that at least one of luminance and illuminance is increased to at least the predetermined value when at least one of data input and an operation function input is performed at the input unit and the mobile communication apparatus is in the second condition.

3. The mobile communication apparatus of claim 1, wherein
   the second condition is a condition in which the first casing and the second casing are moved relative to each other by at least one selected from the group consisting of pivotally moving, rotating, and sliding.

4. The mobile communication apparatus of claim 1, further comprising:
   an antenna; and
   a processing unit configured to send a signal received by the antenna to the control unit,
   wherein the control unit detects the standby state when the signal is received from the processing unit.

5. The mobile communication apparatus of claim 4, wherein the display unit illuminated by the backlight with the first luminance has a brightness sufficient to make a screen of the display unit further usable for carrying out an operation of setting or changing functions of the mobile communication apparatus.

6. A mobile communication apparatus, comprising:
   a first casing having a display unit configured to visibly display information;
   a second casing having an input unit and connected to the first in a manner movable relative to the first casing;

a condition detecting unit configured to detect a change in condition of the mobile communication apparatus between a first condition in which the first casing is overlapped with the second casing and a second condition other than the first condition;

an illumination unit configured to illuminate the display unit; and a timer configured to measure illumination time of the illumination unit;

a control unit configured to detect whether the mobile communication apparatus is in a standby state, and to control the illumination unit to illuminate the display unit with a first luminance greater than zero or to illuminate the display unit with a second luminance greater than zero and less than the first luminance, wherein the control unit is configured to control the illumination unit to illuminate the display unit with the first luminance when the condition detecting unit detects the change in condition of the mobile communication apparatus from the first condition to the second condition and the control unit does not detect the standby state and to then control the backlight to reduce the illumination of the display unit to the second luminance when the timer measures the illumination time of the first luminance and determines that no data communication, data input, and operation function input is performed at the input unit for a first predetermined time, wherein the control unit is further configured to control the illumination unit to illuminate the display unit with the second luminance when the condition detecting unit detects the change in condition of the mobile communication apparatus from the first condition to the second condition and the control unit detects the standby state and to then control the illumination unit to turn off when the timer measures the illumination time of the second luminance and determines that no data input is performed at the input unit for a second predetermined time, wherein the display unit illuminated by the illumination unit with the second luminance has a brightness sufficient to make a screen of the display unit visible for confirmation, and wherein the display unit illuminated with the first luminance has a brightness sufficient to make a screen of the display unit usable for carrying out an operation of making a telephone call from the mobile communication apparatus, viewing or creating or transmitting an e-mail, or establishing a connecting communication to a network.

7. The mobile communication apparatus of claim 6, wherein the control unit controls the illumination unit to illuminate the display unit with the second luminance when the condition detecting unit detects the change in the condition from the first condition to the second condition while a waiting screen is displayed on the display unit in the standby state.

8. The mobile communication apparatus of claim 7, wherein:
the control unit controls the illumination unit to illuminate the display unit such that the illumination unit changes from the second luminance to the first luminance when a data communication is carried out by the mobile communication apparatus, or at least one of data input and an operation function input is performed at the input unit.

9. The mobile communication apparatus of claim 7, wherein:
the second condition is a condition in which the first casing and the second casing are moved relative to each other by at least one selected from the group consisting of pivotally moving, rotating, and sliding.

10. The mobile communication apparatus of claim 7, wherein:
the input unit is illuminated by the illumination unit.

11. The mobile communication apparatus of claim 7, wherein
the input unit includes a plurality of keys and a plurality of illuminators correspondingly provided to the plurality of keys; and
the control unit controls the plurality of illuminators to illuminate the input unit by turning on each of the plural illuminators when the condition detecting unit detects the change in condition from the first condition to the second condition when the mobile communication apparatus is not in the standby state,
wherein the control unit controls the plurality of illuminators to illuminate the input unit by turning on selected ones of the plurality of illuminators when the condition detecting unit detects the change in condition from the first condition to the second condition while the waiting screen is displayed on the display unit in the standby state.

12. The mobile communication apparatus of claim 6, further comprising:
an antenna; and
a processing unit configured to send a signal received by the antenna to the control unit,
wherein the control unit detects the standby state when the signal is received from the processing unit.

13. The mobile communication apparatus of claim 12, wherein the display unit illuminated with the first luminance has a brightness sufficient to make a screen of the display unit further usable for carrying out an operation of setting or changing functions of the mobile communication apparatus.

14. A mobile communication apparatus, comprising:
a first casing having a display unit that includes an organic electroluminescence (EL) device and that is configured to visibly display information;
a second having an input unit and connected to the first casing in a manner movable relative to the first casing;
a condition detecting unit configured to detect a change in condition of the mobile communication apparatus between a first condition in which the first casing is overlapped with the second casing and a second condition other than the first condition; and
a timer configured to measure illumination time of the organic EL device;
a control unit configured to detect whether the mobile communication apparatus is in a standby state, and to control the organic EL device to illuminate the display unit with a first luminance greater than zero or to illuminate the display unit with a second luminance greater than zero and less than the first luminance,
wherein the control unit is configured to control the backlight to illuminate the display unit with the first luminance when the condition detecting unit detects the change in condition of the mobile communication apparatus from the first condition to the second condition and the control unit does not detect the standby state and to then control the organic EL device to reduce the illumination of the display unit to the second luminance when the timer measures the illumination time of the first luminance and determines that no data communication, data input, and operation function input is performed at the input unit for a first predetermined time, wherein the control unit is further configured to control the organic EL device to illuminate the display unit with a second luminance when the condition detecting unit detects the change in condition of the mobile communication apparatus from the first condition to the second condition and the control unit detects the standby state and to then control the organic EL device to turn off when the timer measures the illumination time of the second luminance and determines that no input is performed at the input unit for a second predetermined time, wherein the display unit illuminated by the organic EL device with the second luminance has a brightness sufficient to make a screen of the display unit visible for confirmation, and wherein the display unit illuminated by the organic EL device with the first luminance has a brightness sufficient to make a screen of the display unit usable for carrying out an operation of making a telephone call from the mobile communication apparatus, viewing or creating or transmitting an e-mail, or establishing a connecting communication to a network.

15. The mobile communication apparatus of claim 14, wherein:
the second condition is a condition in which the first casing and the second casing are moved relative to each other by at least one selected from the group consisting of pivotally moving, rotating, and sliding.

16. The mobile communication apparatus of claim 14, wherein the control unit controls the organic EL device to illuminate the display unit with the second luminance when the condition detecting unit detects the change in condition from the first condition to the second condition while a waiting screen is displayed on the display unit in the standby state.

17. The mobile communication apparatus of claim 16, wherein
the second condition is a condition in which the first casing and the second casing are moved relative to each other by at least one selected from the group consisting of pivotally moving, rotating, and sliding.

18. The mobile communication apparatus of claim 14, further comprising:
an antenna; and
a processing unit configured to send a signal received by the antenna to the control unit,
wherein the control unit detects the standby state when the signal is received from the processing unit.

19. The mobile communication apparatus of claim 18, wherein the display unit illuminated by the organic EL device with the first luminance has a brightness sufficient to make a screen of the display unit further usable for carrying out an operation of setting or changing functions of the mobile communication apparatus.

* * * * *